(12) United States Patent
Makino et al.

(10) Patent No.: US 6,796,169 B2
(45) Date of Patent: Sep. 28, 2004

(54) CYLINDER IDENTIFYING SYSTEM FOR INTERNAL COMBUSTION ENGINE

(75) Inventors: Tomokazu Makino, Tokyo (JP); Shiro Yonezawa, Tokyo (JP); Eiji Kanazawa, Tokyo (JP); Takuo Watanuki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 59 days.

(21) Appl. No.: 10/352,173

(22) Filed: Jan. 28, 2003

(65) Prior Publication Data

US 2004/0007054 A1 Jan. 15, 2004

(30) Foreign Application Priority Data

Jul. 10, 2002 (JP) ........................................ 2002-201331

(51) Int. Cl.[7] .............................................. G01M 15/00
(52) U.S. Cl. ..................................................... 73/117.3
(58) Field of Search ............................. 73/117.3, 116, 73/117.2

(56) References Cited

U.S. PATENT DOCUMENTS 5,499,537 A * 3/1996 Nakayama et al. ........ 73/117.3
5,563,515 A * 10/1996 Kako ........................ 73/117.3
6,591,184 B2 * 7/2003 Yonezawa et al. .......... 701/113

FOREIGN PATENT DOCUMENTS

JP 2002-130036 5/2001

* cited by examiner

Primary Examiner—Edward Lefkowitz
Assistant Examiner—Maurice Stevens
(74) Attorney, Agent, or Firm—Sughrue Mion, PLLC

(57) ABSTRACT

A cylinder identifying system for detecting reference position on a per cylinder basis with high accuracy and reliability independently of rotation states of an engine includes a means (31) for generating a plurality of crank angle pulses during rotation of a crankshaft (12), a means (21) for generating cylinder identifying pulses during rotation of a cam shaft (11), a means (40) for detecting reference positions on the basis of the crank angle pulses, a means (40) for setting cylinder identifying intervals with reference to the reference positions, a means (40) for identifying cylinders on the basis of the cylinder identifying pulse signals in the cylinder identifying intervals, and a means (40) for detecting low and high rotation speed ranges of the engine (10). Procedures of first and second performance specifications corresponding to low and high engine rotation speed ranges are changed over in dependence on the engine operation states.

3 Claims, 11 Drawing Sheets

FIG. 6

| DISTRIBUTION ZONE | | | | | | | | | | | | | | | | | | | DROPOUT NUMBER |
|---|---|---|---|---|---|---|---|---|---|---|---|---|---|---|---|---|---|---|---|
| n-17 | n-16 | n-15 | n-14 | n-13 | n-12 | n-11 | n-10 | n-9 | n-8 | n-7 | n-6 | n-5 | n-4 | n-3 | n-2 | n-1 | n | | |
| | | | | | | | | | | | | | | | | | B/C/D | ONE-PULSE DROPOUT | |
| D/E | B/C/D | | | | | | | A/B | | | | | | | | | D/E | TWO-PULSE DROPOUT | |
| | | | | | | | | A/B | | | | | | | | | | | |
| OTHER THAN DITTOS | | | | | | | | | | | | | | | | | | NO DROPOUT | |

FIG. 7

| CURRENTLY DETECTED DETERMINATION ZONE | | | | | | | | | | | | | | | | | |
|---|---|---|---|---|---|---|---|---|---|---|---|---|---|---|---|---|---|
| n-17 | n-16 | n-15 | n-14 | n-13 | n-12 | n-11 | n-10 | n-9 | n-8 | n-7 | n-6 | n-5 | n-4 | n-3 | n-2 | n-1 | n |
| — | — | — | — | — | — | — | — | — | — | A | A | A | A | A | A | A | C |

FIG. 8

| CURRENTLY DETECTED DETERMINATION ZONE | | | | | | | | | | | | | | | | | |
|---|---|---|---|---|---|---|---|---|---|---|---|---|---|---|---|---|
| n-16 | n-15 | n-14 | n-13 | n-12 | n-11 | n-10 | n-9 | n-8 | n-7 | n-6 | n-5 | n-4 | n-3 | n-2 | n-1 | n |
| C | A | A | A | A | A | A | A | A | A | A | A | A | A | A | A | E |

US 6,796,169 B2

CYLINDER IDENTIFYING SYSTEM FOR INTERNAL COMBUSTION ENGINE

BACKGROUND OF THE INVENTION

1. Field of the Invention

The present invention relates generally to a system for controlling timings such as fuel injection timing and ignition timing on a cylinder-by-cylinder basis in an internal combustion engine. More particularly, the present invention is concerned with a cylinder identifying system for an internal combustion engine for detecting reference crank angle positions (hereinafter also referred to simply as the reference positions) for the cylinders, respectively, on the basis of crank angle pulse signals (reference position signals) and cylinder identifying pulse signals for the purpose of controlling the timings such as mentioned above. In particular, the present invention concerns a cylinder identifying system which is capable of detecting with high accuracy and reliability the reference position for each of the cylinders independently of operation states of the internal combustion engine by effectuating a reference position detecting procedure of performance specifications optimal for the engine operation state by selecting the reference position detecting procedure of the optimal performance specifications from those prepared separately for the engine operations in a low rotation speed range and a high rotation speed range, respectively.

2. Description of Related Art

In general, in the internal combustion engine for an internal combustion engine for a motor vehicle or the like, it is required to control optimally the fuel injection timing and the ignition timing in conformance with the operating conditions or operation states of the internal combustion engine. For satisfying such requirement, signal generating means including respective sensors are provided in association with rotatable shafts (a crank shaft and a cam shaft) of the internal combustion engine with a view to generating reference position signals indicating the reference positions, respectively, on a cylinder-by-cylinder basis and cylinder identifying pulse signals for identifying discriminatively the individual or specific cylinders, respectively. On the basis of these signals, discriminative identification of the engine cylinders is carried out.

As the conventional cylinder identifying system for the internal combustion engine known heretofore, there may be mentioned the one disclosed, for example, in Japanese Patent Application Laid-Open Publication No. 317930/2000.

The reference position detecting means employed in the above-mentioned conventional cylinder identifying system for the internal combustion engine is so arranged as to generate a number of equidistant pulse signals (i.e., pulses having equal inter-pulse intervals) as the crank angle pulse signals while generating a plurality of nonequidistant pulse signals corresponding, respectively, to the reference positions admixedly in the equidistant crank angle pulse signals, wherein the reference positions indicated by the nonequidistant pulse signals admixed in the crank angle pulse signals are detected on the basis of the changes of the period ratios TR(n) among the individual pulses of the crank angle pulse signals and the nonequidistant pulse signals.

More specifically, the period ratio TR(n) is determined from the periods T(n−1) and Tn of a preceding crank angle pulse signal and a current crank angle pulse signal Tn in accordance with $$TR(n) = Tn/T(n-1)$$

Subsequently, the period ratio TR(n) as determined is compared with a predetermined value Kr. At the time point when the comparison shows that $TR(n) \geq Kr$, the reference position can then be discriminatively recognized or identified.

On the basis of the reference positions detected for the cylinders in this manner, the fuel injection timings and the ignition timings can be controlled for the individual cylinders with high accuracy.

However, the relatively simple reference position detecting means such as described above is disadvantageous in that when the rotation period of the engine changes abruptly as encountered in the engine cranking operation or upon combustion stroke of the engine cylinder, the period of the crank angle pulse signal which is to remain constant will change, resulting in erroneous detection of the reference position. In other words, in the situations such as mentioned above, it becomes impossible to detect the reference position with reasonable accuracy and reliability, which incurs erroneous control of the individual cylinders, giving rise to a problem.

In order to detect the reference position with high accuracy and reliability while avoiding the erroneous detection or identification of the reference position and the engine cylinders, there is demanded very complicate arithmetic operation procedure which can certainly be executed during a cranking operation in a low rotation speed range. However, in a high rotation speed range where the number of interrupt processings issued for a microcomputer constituting a major part of an engine control unit increases, there will arise such undesirable situation that the arithmetic operation procedure for detecting the reference position can not timely be executed.

To say in another way, when the detection procedure of simple performance specifications is employed for detecting the reference position from the crank angle pulse signals in the conventional apparatus, detection of the reference position with high accuracy is rendered impossible in the low rotation range where the period of the crank angle pulse signal changes remarkably.

On the other hand, when the detection procedure of complicate performance specifications is resorted to, the arithmetic operation processing as involved can not timely be executed but may be skipped, to another problem.

As is apparent from the foregoing, the conventional cylinder identifying system for the internal combustion engine suffers a problem that when a simple reference position detecting means is employed, the reference positions of the individual cylinders will be erroneously detected or identified upon change of the rotation period of the internal combustion engine, making it impossible to realize detection of the reference position with reasonable accuracy.

On the other hand, in the case where complicate arithmetic operation processing procedure is adopted in an effort to enhance the accuracy of detection of the reference position, the number of the interrupt processings issued to the microcomputer or ECU will become too large to be executed by the microcomputer in a high rotation speed range, giving rise to a problem that the reference position can not be detected with desired accuracy and reliability.

SUMMARY OF THE INVENTION

In the light of the state of the art described above, it is an object of the present invention to provide a cylinder identifying system for the internal combustion engine which is capable of detecting the reference positions on a cylinder-by-cylinder basis with a high accuracy and an enhanced reliability independently of different rotation ranges and change of the engine rotation speed by providing performance specifications for low and high rotation speed ranges, respectively, in executing the reference position detecting processing procedure.

In view of the above and other objects which will become apparent as the description proceeds, there is provided according to a general aspect of the present invention a cylinder identifying system for an internal combustion engine.

The cylinder identifying system includes a crank angle signal generating means for generating a plurality of crank angle pulse signals in correspondence to rotation angles of a crank shaft of the internal combustion engine, a cylinder identifying signal generating means for generating cylinder identifying pulse signals corresponding to cylinders, respectively, of the internal combustion engine during rotation of a cam shaft arranged to rotate at a ratio of 1/2 relative to the rotation of the crank shaft, a reference position detecting means for detecting reference positions on the basis of the crank angle pulse signals, a cylinder identifying interval setting means for setting cylinder identifying intervals with reference to the reference positions, a cylinder identifying means for identifying the individual cylinders on the basis of the cylinder identifying pulse signals in the cylinder identifying intervals, and an operation state detecting means for detecting operation state of the internal combustion engine in a low rotation speed range and a high rotation speed range of the internal combustion engine.

The reference position detecting means mentioned above is composed of a first detection processing means for effectuating a processing procedure of the performance specifications corresponding to the low rotation speed range, and a second detection processing means for effectuating a processing procedure of first performance specifications corresponding to the high rotation speed range. Operations of the first detection processing means and the second detection processing means are changed over with each other in dependence on the operation states of the internal combustion engine.

By virtue of the arrangement of the cylinder identifying system for the internal combustion engine described above, the reference positions can be detected on a cylinder-by-cylinder basis with a high accuracy and an enhanced reliability regardless of the different rotation ranges and change of the engine rotation speed.

In a preferred mode for carrying out the invention, the operation state detecting means may be so designed as to detect the rotation number of the internal combustion engine as an engine rotation number while the reference position detecting means may be designed to change over the first reference position detecting means and the second reference position detecting means with each other in dependence on the engine rotation number.

With the arrangement of the cylinder identifying system described above, it is possible to detect the reference positions on a cylinder-by-cylinder basis with high accuracy and reliability without incurring any appreciable increase in the cost.

In another preferred mode for carrying out the invention, the operation state detecting means may be so designed as to detect a cranking state of the internal combustion engine while the reference position detecting means may be designed to change over the first reference position detecting means and the second reference position detecting means with each other in dependence on presence or absence of the cranking state.

With the arrangement of the cylinder identifying system described above, the reference position can be detected for each of the individual cylinders with enhanced accuracy and reliability while mitigating overhead involved in the arithmetic operation.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which:

FIG. 6 is a view showing a pulse (tooth) dropout number determination map employed for a four-cylinder type engine according to the first embodiment of the invention;

FIG. 7 is a view showing an example of detection of determination zones according to the first embodiment of the invention;

FIG. 8 is a view showing another example of detection of determination zones according to the first embodiment of the invention;

DESCRIPTION OF THE PREFERRED EMBODIMENTS

Figure 1:
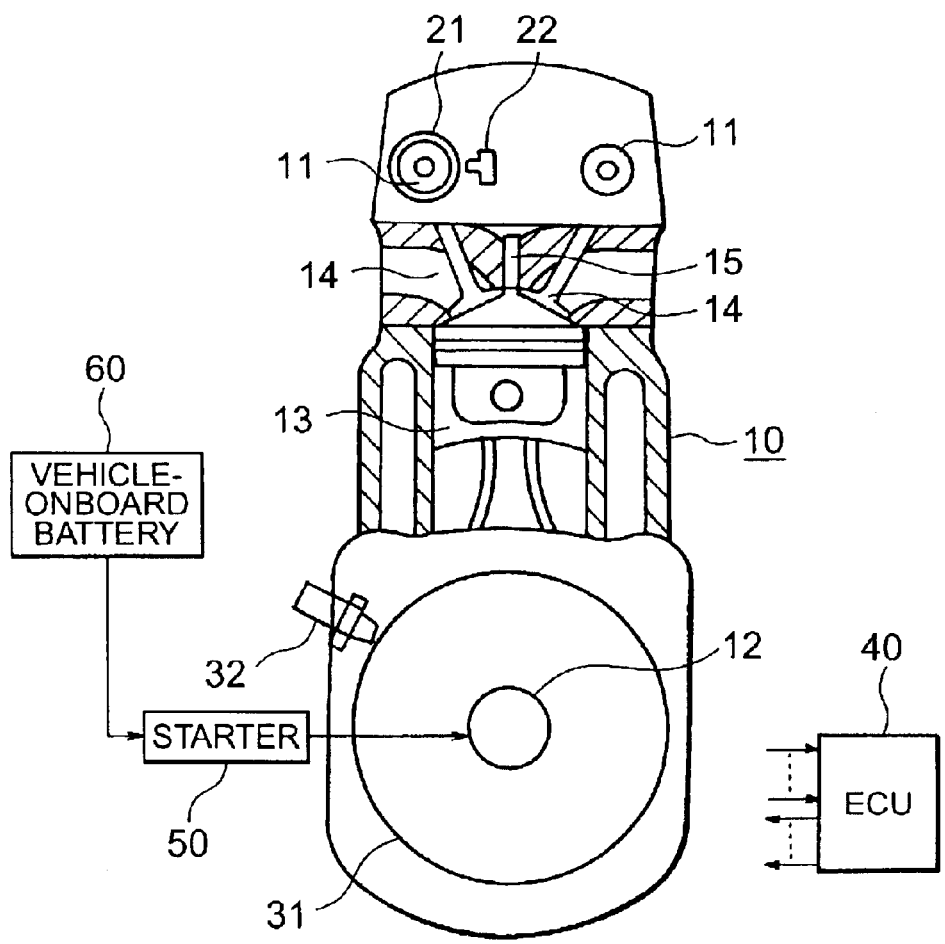
FIG. 1 is a view showing schematically and generally an internal combustion engine system according to a first embodiment of the present invention together with a control unit.

The present invention will be described in detail in conjunction with what is presently considered as preferred or typical embodiments thereof by reference to the drawings. In the following description, like reference characters designate like or corresponding parts throughout the several views.

Embodiment 1

FIG. 1 is a view showing schematically and generally an internal combustion engine system according to a first embodiment of the present invention together with a control unit (electronic control unit or ECU in abbreviation).

Referring to FIG. 1, an engine 10 constituting a major part of the internal combustion engine system includes a plurality of pistons 13 disposed movably within a corresponding number of engine cylinders, respectively, for driving rotationally a cam shaft 11 and a crank shaft 12. Each of the cylinders is equipped with a spark plug 15 disposed in a combustion chamber defined within the cylinder and valves 14 for suction of an air-fuel mixture and for discharging of an exhaust gas resulting from combustion of the air-fuel mixture within the combustion chamber.

The spark plugs 15 and fuel injection valves (not shown) are controlled by a control unit (ECU) 40 which is so arranged as to fetch detection information outputted from various types of sensors (not shown) by way of an input circuit (not shown either) to thereby determine arithmetically control parameters for controlling operation of the engine 10.

The control unit 40 is comprised of a microcomputer or microprocessor as a major component and includes a CPU (Central Processing Unit), a ROM (Read-Only Memory), a RAM (Random Access Memory), a timer, input/output ports and input/output interfaces and others.

The crank shaft 12 is driven rotationally by the pistons 13 which are moved reciprocatively within the associated cylinders, respectively.

On the other hand, the cam shaft 11 is operatively coupled to the crank shaft 12 by way of a mechanical transmitting means such as a timing belt (not shown either) so that the cam shaft 11 rotates once completely during the time period in which the crank shaft 12 rotates twice completely. To say in another way, the ratio of rotation of the cam shaft 11 relative to the crank shaft 12 is represented by "1/2".

A signal disk (rotatable disk) 21 which constitutes a part of a cylinder identifying signal generating means is mounted on the cam shaft 11. A cylinder identifying sensor 22 of an electromagnetic pickup type or the like is disposed in opposition to the signal disk 21 for identifying discriminatively the individual cylinders. The cylinder identifying sensor 22 is designed to generate a cylinder identifying pulse signal, which will be described later on.

Similarly, a signal disk (rotatable disk) 31 which constitutes a part of a crank angle signal generating means is mounted on the crank shaft 12. A crank angle sensor 32 of an electromagnetic pickup type or the like is disposed in opposition to the signal disk 31 for the purpose of detecting crank angle positions. The crank angle sensor 32 is designed to generate a crank angle pulse signal, which will also be described hereinafter.

A rotatable shaft or output shaft of a starter 50 is disengageably coupled to the crank shaft 12. The starter 50 is electrically connected to a vehicle-onboard battery (hereinafter also referred to simply as the battery) 60.

The starter 50 is supplied with an electric power from the battery 60 through a power switch and a starter switch (both not shown) which are interlinked each other. The starter 50 is operatively connected to the crank shaft 12 upon starting of operation of the engine 10, whereby cranking operation of the engine 10 is carried out.

Figure 2:
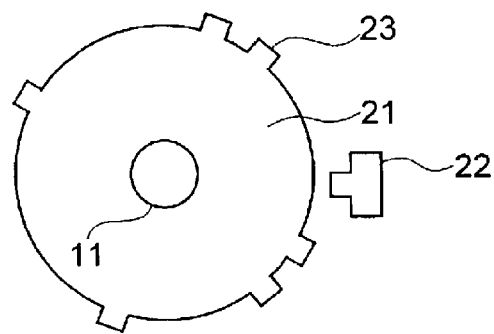
FIG. 2 is a side elevational view showing a peripheral geometry of a signal disk of a cylinder identifying signal generating means mounted on a cam shaft shown in FIG. 1.
Figure 3:
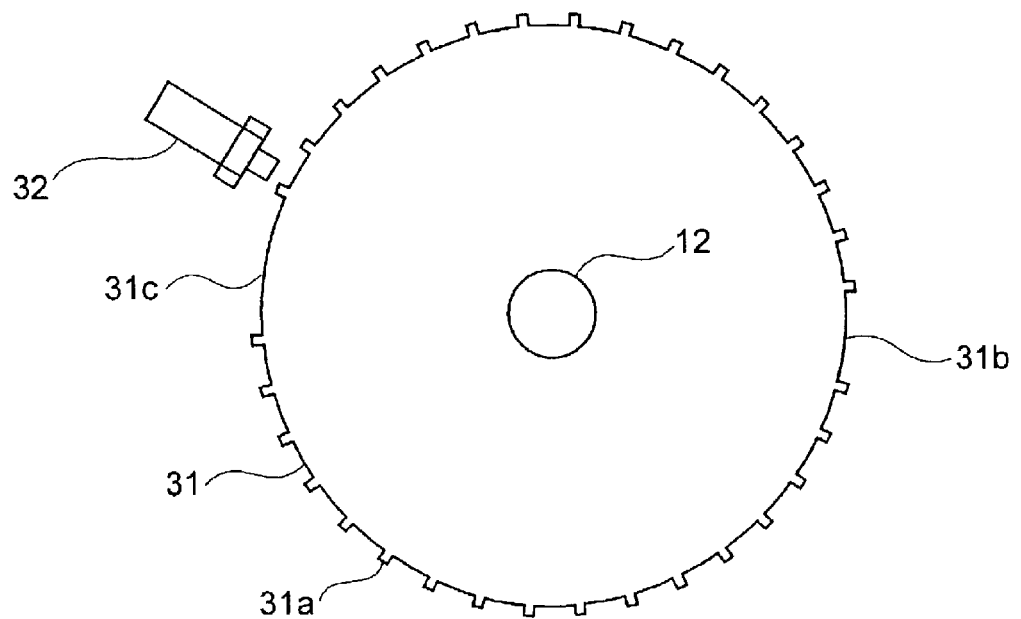
FIG. 3 is a side elevational view showing a peripheral geometry of a signal disk of a part of a crank angle signal generating means mounted on a crank shaft shown in FIG. 1.

FIG. 2 is a side elevational view showing exemplarily a peripheral geometry of the signal disk 21 of the cylinder identifying signal generating means, and FIG. 3 is a side elevational view showing exemplarily a peripheral geometry of the signal disk 31 which serves as a part of the crank angle signal generating means, as mentioned previously.

Referring to FIG. 2, the signal disk 21 of the cylinder identifying signal generating means is provided with teeth or projections 23 in an asymmetry array along the outer peripheral edge of the disk. On the other hand, the signal disk 31 of the crank angle signal generating means is provided with projections 31a (also referred to as the teeth) along the peripheral edge with equidistance of e.g. 10° therebetween.

In this conjunction, it should however be mentioned that the signal disk 31 mounted on the crank shaft is provided with tooth dropout sections 31b and 31c at which the projections or teeth 31a are not formed along the outer peripheral edge of the signal disk 31. Further, it is to be noted that the angular spans of the tooth dropout sections 31b and 31c differ from each other.

By way of example, the angular span of the tooth dropout section 31b is selected to be 20° in terms of the crank angle (hereinafter written as 20° CA), while that of the tooth dropout section 31c is selected to be 30° CA.

Referring to FIGS. 1 to 3, when operation or rotation of the engine 10 is started, the signal disk 31 of the crank angle signal generating means mounted on the crankshaft 12 rotates, in the course of which the crank angle sensor 32 detects the projections or teeth 31a to thereby generate crank angle pulse signals (hereinafter also referred to simply as the crank angle pulses).

Further, the signal disk 21 of the cylinder identifying signal generating means rotates simultaneously with the signal disk 31. In the course of rotation of the signal disk 21, the cylinder identifying sensor 22 detects the projections or teeth 23 to thereby generate the cylinder identifying pulse signals (hereinafter also referred to simply as the cylinder identifying pulses).

The control unit 40 is so designed or programmed as to serve not only as the engine controller in charge of controlling the operation of the engine system as a whole but also as the cylinder identifying module. The cylinder identifying module is functionally associated with both the cylinder identifying signal generating means including the cylinder identifying sensor 22 and the crank angle signal generating means including the crank angle sensor 32.

The control unit 40 is comprised of a reference position detecting means for detecting reference positions on the basis of the crank angle pulse signals, a cylinder identifying interval setting means for setting as cylinder identifying intervals with reference to the reference positions, a cylinder identifying means for identifying the individual cylinders on the basis of the cylinder identifying pulse signals generated during the cylinder identifying interval, and a operation state detecting means for detecting discriminatively the operation states of the engine 10 in a low rotation speed range and a high rotation speed range, respectively.

The reference position detecting means includes a first detection processing means for validating the processing procedure of first performance specifications which correspond to the engine operation state in the low rotation speed range and a second detection processing means for validating the processing procedure of second performance specifications which correspond to the engine operation state in the high rotation speed range. Further, the reference position detecting means is so designed as to change over the first detection processing means and the second detection processing means with each other in dependence on the operation states of the engine 10.

The operation state detecting means incorporated in the control unit 40 is designed to detect the rotation number or speed (rpm) of the engine 10, while the reference position detecting means is arranged to change over a first reference position detecting means and a second reference position detecting means with each other in dependence on the engine rotation number (rpm).

Figure 4:
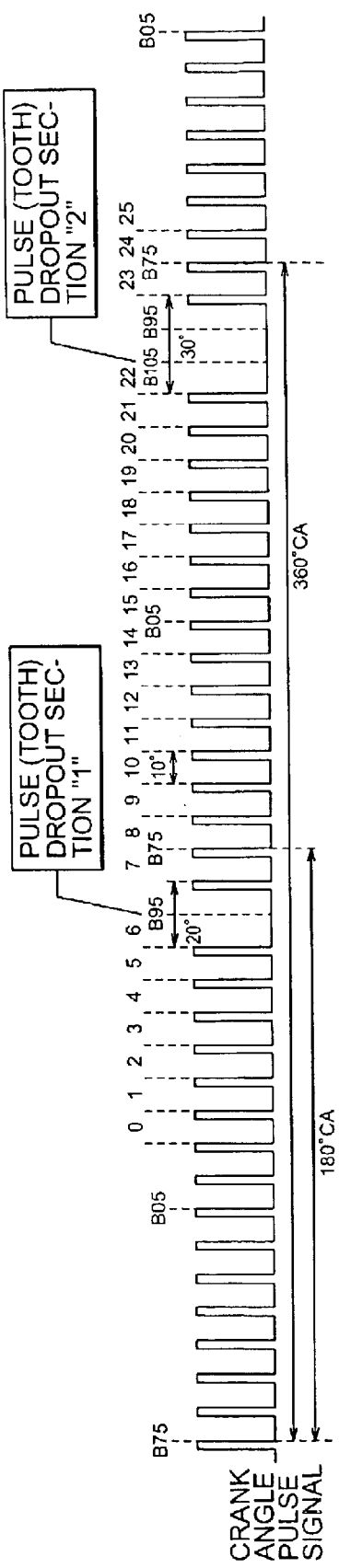
FIG. 4 is a timing chart showing a pattern of crank angle pulse signals generated in a four-cylinder internal combustion engine according to the first embodiment of the invention.

FIG. 4 is a timing chart showing individual crank angle pulses generated by the crank angle sensor 32 in cooperation with the signal disk 31 as described previously by reference to FIGS. 1 to 3. In more concrete, FIG. 4 shows, by way of example, a signal pattern originating in the rotation of the crank shaft 12 on the presumption that the engine now under consideration is a four-cylinder engine.

Referring to FIG. 4, there are shown the output pulses generated by the crank angle signal generating means in correspondence to the projections or teeth 31a, respectively, of the signal disk 31 shown in FIG. 3 during the interval (360° CA) in which two cylinders of the four-cylinder engine 10 are controlled, wherein numbers "0" to "25" are affixed correspondingly to the pulses generated every detection timings.

As can be seen in FIG. 4, the crank angle pulse signals are composed of the pulses which are generated every 10° CA and there exist two pulse dropout sections which correspond to the reference positions defined every angular interval of 180° CA (i.e., at a first position of 95° CA before the top dead center (TDC), as indicated by B95, and at a second position of 105° CA before the top dead center, as indicated by B105 and B95) during one complete rotation of 360° CA.

More specifically, in the crank angle pulse signals, there exist a pulse dropout section "1" (corresponding to the tooth dropout section 31b shown in FIG. 3) extending over an angular span of 20° CA as indicated by B95 in FIG. 4 and a pulse dropout section "2"(corresponding to the tooth dropout section 31c of the disk 31 shown in FIG. 3) extending over an angular span of 30° CA as indicated by B105 and B95 in FIG. 4, wherein the reference positions (B75) for the cylinders are defined specifically by these pulse dropout sections, respectively.

Figure 5:
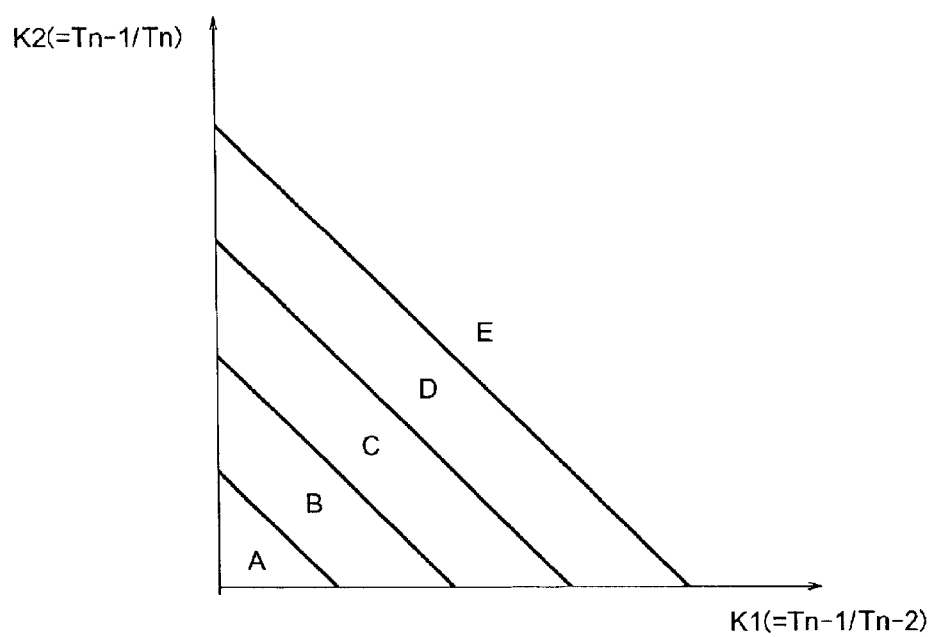
FIG. 5 is a diagram illustrating a distribution of zones A to E referenced in determining the number of pulse dropouts (teeth dropouts) according to the first embodiment of the invention.

FIG. 5 is a diagram illustrating a distribution pattern of zones A to E which are used for determining or deciding the number of pulse dropouts (teeth dropouts) according to the first embodiment of the invention. The zones A to E are set on the basis of the ratios between the crank angle pulse signal periods Tn.

In FIG. 5, ratio K1 of a preceding period to the period before the preceding period (hereinafter also referred to as the pre-preceding period), i.e., "K1=T(n−1) (preceding crank angle pulse signal period)/T(n−2) (pre-preceding crank angle pulse signal period)" is taken along the abscissa while ratio K2 of the preceding period to the current period, i.e., "K2=T(n−1) (preceding crank angle pulse signal period)/Tn (current crank angle pulse signal period)" is taken along as the ordinate.

Referring to FIG. 5, the zones referenced in determining or deciding the number of the pulse dropouts (teeth dropouts) are distributively classified into five zones A, B, C, D and E which are defined by both the ratios K1 (=T(n−1)/ T(n−2)) and k2 (=T(n−1)/Tn) on the basis of the current crank angle pulse signal period Tn, the preceding crank angle pulse signal period T(n−1) and the pre-preceding crank angle pulse signal period T(n−2) . At this juncture, it should be added that each of the zones A to E is set to a width which is large enough to absorb tolerable dispersions such as variation or fluctuation of rotation of the engine 10.

FIG. 6 is a view showing a pulse (tooth) dropout number decision or determination map for the internal combustion engine on the presumption that the engine is of four-cylinder type. This map is used for determining the pulse dropout number (i.e., "dropout of one pulse (tooth)", "dropout of two pulses (two teeth), and "no pulse (tooth) dropout (absence of the pulse (tooth) dropout)".

Next, referring to FIGS. 7 and 8 together with FIGS. 1 to 6, processing procedure executed in the cylinder identifying system according to the first embodiment of the invention will be described in more concrete.

In the first place, description will be directed to the detection of the reference positions with high accuracy by resorting to the processing procedure of the first performance specifications oriented for the low rotation speed range (i.e., the first reference position detecting means).

At first, the pre-preceding value, the preceding value and the current value of the crank angle pulse signal period are represented by T(n−2), T(n−1) and Tn, respectively. Then, the period ratios K1 and K2 are arithmetically determined for every crank angle pulse signal period (upon every input of the crank angle pulse signal) in accordance with the undermentioned expressions (1) and (2):

$$K1 = T(n-1)/T(n-2) \qquad (1)$$

$$K2 = T(n-1)/Tn \qquad (2)$$

Subsequently, by referencing the distribution map (FIG. 5) showing the zones to be referenced in determining the pulse dropout number (teeth dropout number), the relevant one of the distribution zones A to E is determined on the basis of the results of computation of the period ratios K1 and K2 in accordance with the expressions (1) and (2).

Further, the pulse (tooth) dropout number ("0(none)", "1" or "2") is determined by comparing the zone determined from FIG. 5 with the pulse (tooth) dropout number determination map for the four-cylinder engine (FIG. 6), which is then followed by determination of the reference position (B75) on the basis of the pulse (tooth) dropout number as determined.

At this juncture, let's assume that all of the crank angle pulse signal periods Tn conform with the angular span or distance (10° CA) (i.e., the engine is in the stable rotation state). Then, the determination zone corresponding to the pulse (tooth) dropout number is "A" when the preceding crank angle pulse signal period T(n−1) indicates "no pulse dropout section" while the zone is "C" when the preceding crank angle pulse signal period T(n−1) indicates "one pulse dropout section"where the number of the dropout is "1". Further, when the preceding crank angle pulse signal periodT(n−1) indicates "two pulse (two-teeth) dropout section", the zone is then determined to be "E".

Next, referring to FIGS. 7 and 8 together with FIG. 4 showing the crank angle pulse signal pattern, description will be made of the pulse (tooth) dropout detection processing in the low rotation speed range.

FIGS. 7 and 8 are views for illustrating examples of the determination zones (A, . . . , E) detected actually.

In FIG. 4, the numerals affixed atop the crank angle pulses indicate the order or sequence in which these crank angle pulses are detected. In this conjunction, it is presumed for the convenience of description that the crank angle pulse signal period Tn as detected exhibits a theoretical value which conforms with the inter-tooth angular span.

Now, let's assume, by way of example, that the engine 10 is operating in the low rotation speed range, as decided on the basis of the pulse number of the crank angle pulse signals. In that case, processing procedure of the performance specifications for the low rotation speed range is selected to be adopted in the decision processings described below.

In the first place, it is assumed that the crank angle pulse signals detected till the current time point are "1" to "6". Then, the zone "A" shown in FIG. 5 is determined because these crank angle pulse signals are detected periodically at the interval of 10° CA and hence K1=K2=1.

Subsequently, when the crank angle pulse signal "7" is detected, the current crank angle pulse signal period Tn is of 20° CA, indicating the pulse dropout section. However, since the preceding crank angle pulse signal period T(n−1) does not correspond to the pulse dropout section, the zone "A" is also determined since K1=1 and K2=1/2.

Next, when the crank angle pulse signal "8" is detected, then the zone "C" is determined since the preceding crank angle pulse signal period T(n−1) corresponds to the interval of 20° CA and hence K1=K2=2.

At this time point, the determination zones have been detected in the intervals succeeding to "n−7". On the other hand, the determination zone has not been detected at "n−8" to "n−16" or "n−8" to "n−17". Consequently, comparison with the pulse (tooth) dropout number determination map pattern shown in FIG. 6 is impossible. Thus, the pulse (tooth) dropout number decision processing is not executed.

Next, when the crank angle pulse signal "9" is detected, the pre-preceding crank angle pulse signal period T(n−2) represents the pulse dropout section. However, since the preceding crank angle pulse signal period T(n−1) does not correspond to the pulse dropout section, the zone "A" is determined since K1=1/2 and K2=1, similarly to the case of the detection of the crank angle pulse signal "7".

For the successive crank angle pulse signals "10" to "22", the zone "A" is determined since the crank angle pulse signal period corresponds to 10° CA for all of these crank angle pulse signal periods and hence K1=K2=1.

In succession, when the crank angle pulse signal "23" is detected, then the current crank angle pulse signal period Tn corresponds to the pulse dropout section (of 20° CA). However, since the preceding crank angle pulse signal period T(n−1) does not correspond to the pulse dropout section, the zone "A" is determined since K1=1 with K2=1/3.

Further, when the crank angle pulse signal "24" is detected, then the zone "E" is determined since the preceding crank angle pulse signal period T (n−1) corresponds to the interval of 30° CA and hence K1=K2=3.

The determination zones having detected at the current time point are such as shown in FIG. 8. More specifically, all the determination zones for the cylinder identifying intervals "n−16" to "n" have been detected.

Thus, the zone data which can be compared with the pulse (tooth) dropout number determination map pattern shown in FIG. 6 are now available. Accordingly, it is possible to detect that the crank angle pulse signal "23" at the current time point represents "two (teeth) pulse dropout section".

In this way, in the low rotation speed range, it is detected at the time point of detection of the crank angle pulse signal "24" that the crank angle pulse signal "23" represents "two pulse (teeth) dropout section" and that the angular position at the time point of detection of the crank angle pulse signal "24" is the reference position "B75° CA".

Further, since the determination zone is determined on the basis of the determination zone distribution diagram shown in FIG. 5 and since "the pulse (tooth) dropout number" is determined at the time point at which a sufficient number of the serial determination zones are available, it is possible to detect the reference position with high reliability.

Next, description will briefly be made of the reference position detection processing executed by resorting to a processing procedure of the second performance specifications for the high rotation speed range (i.e., the second reference position detecting means).

At first, a period ratio product K is calculated on the basis of the pre-preceding crank angle pulse signal period T(n−2), the preceding crank angle pulse signal period T(n−1) and the current crank angle pulse signal periods Tn in accordance with the undermentioned expression (3):

$$K = K1 \cdot K2 \qquad (3)$$
$$= (T(n-1)/T(n-2)) \times (T(n-1)/Tn)$$

Subsequently, the period ratio product K determined in accordance with the above expression (3) is compared with predetermined values "2.25" and "6.25", respectively, to thereby determine the pulse (teeth) dropout number in the manner described below.

When K≦2.25, no pulse (tooth) dropout is determined.

When 2.25<K≦6.25, dropout of one pulse (tooth) is determined.

When 6.25<K, dropout of two pulses (teeth) is determined.

The theoretical value of the period ratio product K is "1" or "0.5" for "no pulse (tooth) dropout, while it is "4" for "one pulse (tooth) dropout section" with "9" for "two pulse (teeth) dropout section". However, the predetermined values for the comparative decisions mentioned above are set to the values with which tolerance dispersion such as variation of rotation of the engine 10 can be absorbed.

As can be understood from the above, it is possible to determine the reference position through simple arithmetic operation within a short time by detecting "the pulse (tooth) dropout number" for each of the crank angle pulse signal periods.

Next, referring to FIG. 4, description will turn to the pulse (tooth) dropout detection processing operation in the high rotation speed range on the presumption that each crank angle pulse signal period is of the theoretical value which conforms to the angular span or distance for the convenience of description.

When it is determined on the basis of the number of the crank angle pulses that the engine 10 is operating in the high rotation speed range, the processing procedure of the second performance specifications for the high rotation speed range is selected to be adopted in the decision processings described below.

For the crank angle pulse signals "1" to "6", the pre-preceding, the preceding and the current crank angle pulse signal periods are given, respectively, as follows:

$T(n-2)=1$ $T(n-1)=1$ $Tn=1$

Accordingly, from the expression (3) mentioned previously, K=1, which indicates "no pulse (tooth) dropout (absence of pulse (tooth) dropout)".

Subsequently, when the crank angle pulse signal "7" is detected, the pre-preceding, the preceding and the current crank angle pulse signal periods are, respectively, as follows:

$T(n-2)=1$ $T(n-1)=1$ $Tn=2$

Thus, it is determined that K=0.5, indicating "no pulse (tooth) dropout (absence of pulse tooth dropout)".

In succession, upon detection of the crank angle pulse signal "8", the pre-preceding, the preceding and the current crank angle pulse signal periods are, respectively, as follows:

$T(n-2)=1$ $T(n-1)=2$ $Tn=1$

Accordingly, it is determined that K=4, indicating "one pulse (tooth) dropout".

In this manner, at the time point when the crank angle pulse signal "8" is detected, it is determined that the crank angle pulse signal "7" represents "one pulse (tooth) dropout". Thus, the current angular position at the time point the crank angle pulse signal "8" is detected can be determined to be the reference position "B75° CA".

As is apparent from the above, it is possible to determine "pulse (tooth) dropout number" through the arithmetic processing within a short time (corresponding to three crank angle pulses) without need for resorting to the dropout determination map decision shown in FIG. 5. In this way, the reference position can be detected without fail even in the high rotation speed range.

Next, referring to flow charts shown in FIGS. 9 to 11, description will be made in detail of a processing procedure of changing over the reference position detecting means mentioned hereinbefore and the reference position detecting processing procedures in the low rotation speed range and the high rotation speed range, respectively.

Figure 9:
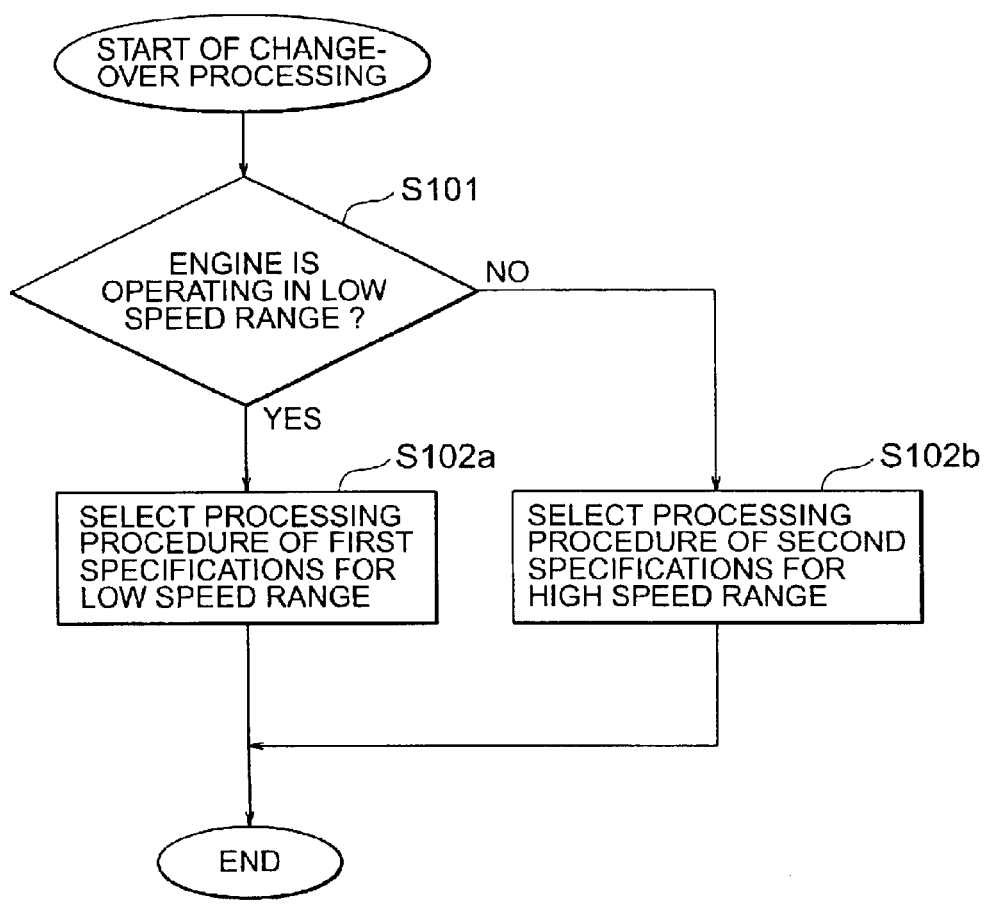
FIG. 9 is a flow chart showing a processing routine for changing over first and second reference position detecting means according to the first embodiment of the invention.
Figure 10:
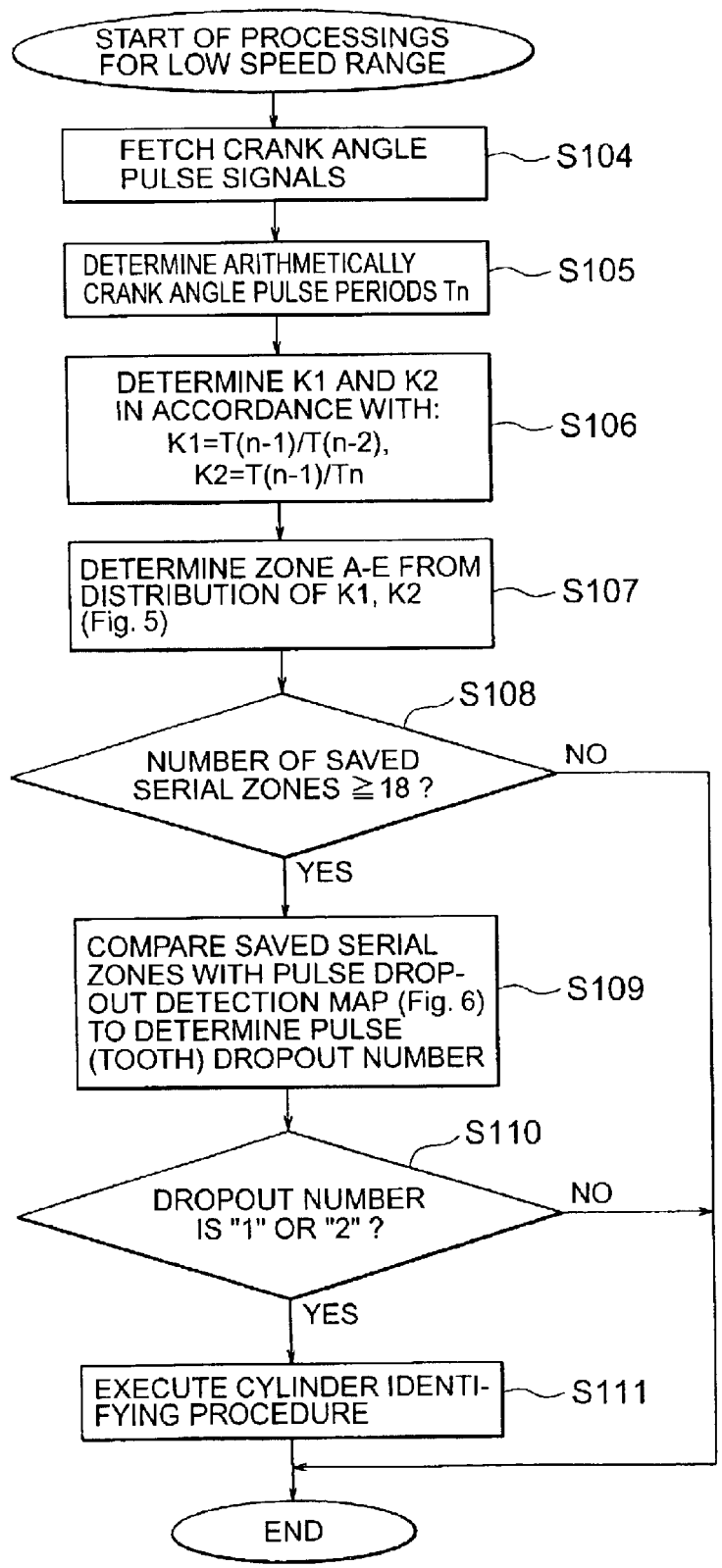
FIG. 10 is a flow chart showing a reference position (pulse dropout) detection processing routine executed in a low rotation speed range of the engine according to the first embodiment of the invention.
Figure 11:
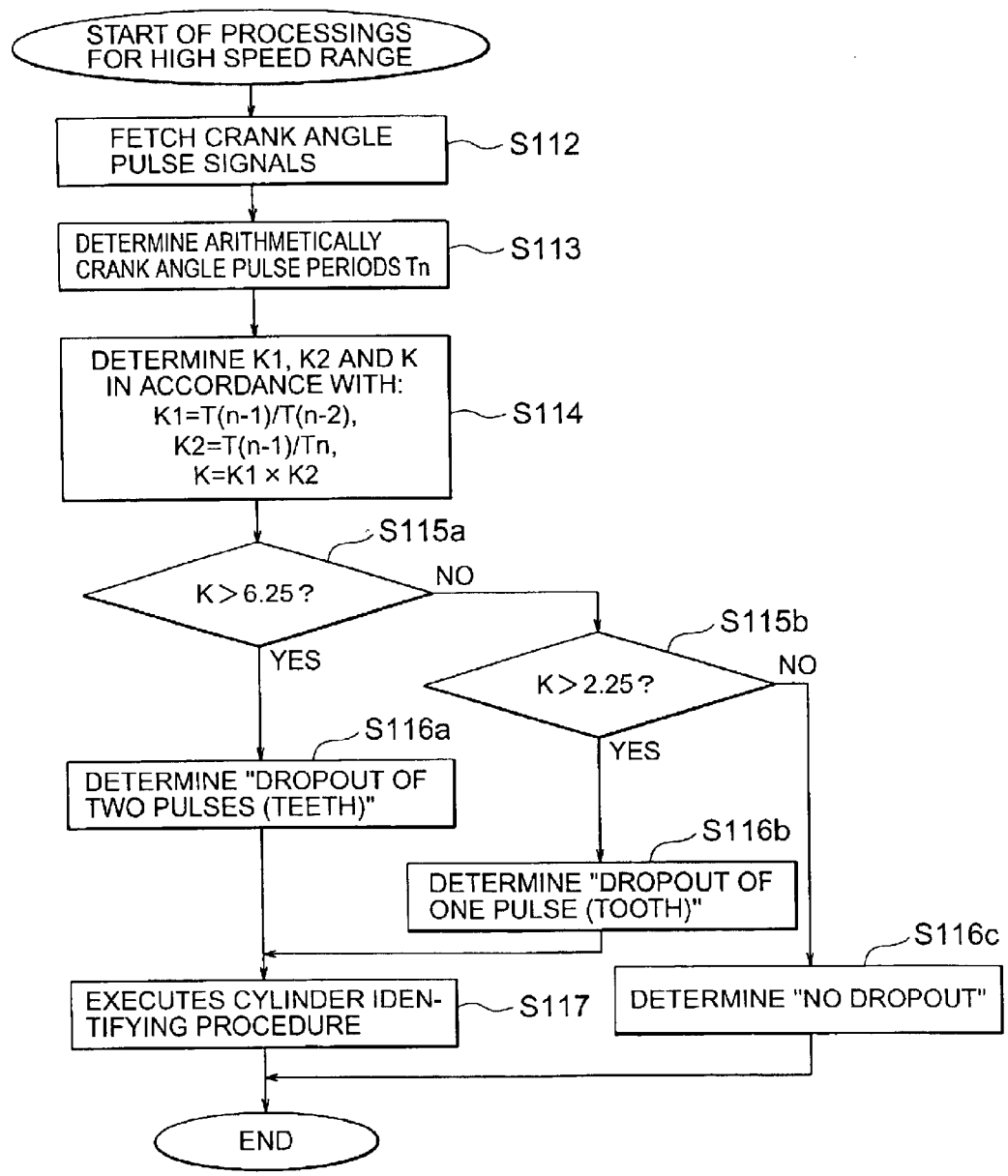
FIG. 11 is a flow chart showing a reference position (pulse dropout) detection processing routine executed in a high rotation speed range of the engine according to the first embodiment of the invention.

FIG. 9 is a flow chart showing a processing routine for changing over the first and the second reference position detecting means, FIG. 10 is a flow chart showing a reference position detection processing routine in the low rotation speed range, and FIG. 11 is a flow chart showing a reference position detection processing routine in the high rotation speed range.

For detecting the reference position (s) (pulse dropout section(s)), the changeover processing routine illustrated in FIG. 9 is firstly executed.

Referring to FIG. 9, decision is firstly made as to whether or not the engine 10 is operating in the low rotation speed range (step S101).

When it is decided in the step S101 that the engine 10 is operating in the low rotation speed range (i.e., when the decision step S101 results in affirmation "YES"), the processing procedure of the first performance specifications for the low rotation speed range (see FIG. 10) is selected for detecting the reference position (step S102a).

Further, when it is decided in the step S101 that the engine 10 is not operating in the low rotation speed range (i.e., when the decision step S101 results in negation "NO"), the processing procedure of the second performance specifications for the high rotation speed range (see FIG. 11) is selected for detecting the reference position (step S102b), whereon the processing routine shown in FIG. 9 comes to an end.

Next, referring to the flow hart shown in FIG. 10, description will be made of the decision processing routine in which the processing procedure of the first performance specifications for low rotation speed range is adopted.

Referring to FIG. 10, the crank angle pulse signals are firstly fetched (step S104) to thereby arithmetically determine the crank angle pulse signal periods Tn (step S105), whereon the period ratios K1 and K2 are calculated in accordance with the undermentioned expressions (4) and (5):

$$K1=T(n-1)/T(n-2) \qquad (4)$$

$$K2=T(n-1)/Tn \qquad (5)$$

Subsequently, the zones A–E are discriminatively decided from FIG. 5 by using the period ratios K1 and K2 determined arithmetically in accordance with the above expressions (4) and (5), the results of which are then sequentially or serially saved (step S107).

Next, decision is made whether the number of the saved serially zones is equal to or greater than "18" (step S108). When it is decided that the number of the saved serial zones<18 (i.e., when the step S108 results in negation "No"), the processing routine shown in FIG. 10 is terminated without executing the pulse (tooth) dropout number decision processing and the cylinder identification processing procedure.

On the other hand, when it is decided in the step S108 that the number of saved serial zones≧18 (i.e., when the step S108 is "Yes"), the saved serial zones are compared with the pulse (tooth) dropout number determination map (see FIG. 6) for thereby determine the number of the pulse (tooth) dropout ("0", "1" or "2") in a step S109.

By determining or detecting discriminatively the number of pulse (tooth) dropout(s), it is possible to detect the reference position. More specifically, decision is made as to whether the pulse (tooth) dropout number is "1" or "2" in a step S110. When it is decided that the pulse (tooth) dropout is "0" (i.e., when the step S110 is "No"), then the processing routine shown in FIG. 10 is terminated without executing the cylinder identification processing procedure.

On the contrary, when "dropout of one pulse" or "dropout of two pulses (teeth)" is decided in the step S110, the cylinder identification processing procedure is executed in a step S111, whereon the processing routine shown in FIG. 10 comes to an end.

Next, referring to FIG. 11, description will be directed to the processing routine in which the reference position identifying procedure of the second performance specifications for the high rotation speed range is adopted.

Referring to FIG. 11, the crank angle pulse signals are fetched or acquired (step S112), and the crank angle pulse signal period is arithmetically determined (step S113), whereon the period ratio product K is arithmetically determined in accordance with the expressions (3) to (5) mentioned hereinbefore (step S114). Namely, $$K1=T(n-1)/T(n-2) \qquad (4)$$

$$K2=T(n-1)/Tn \qquad (5)$$

$$K=K1 \times K2 \qquad (6)$$

Subsequently, the period ratio product K is compared with the first predetermined value "6.25" to decide whether or not K>6.25 (step S115a).

When it is decided in the step S115a that K≦6.25 (i.e., when the step S115a is "No"), then the period ratio product K is compared with the second predetermined value "2.25" to decide whether or not K>2.25 (step S115b).

When it is decided in the step S115a that K>6.25 (i.e, when the step S115a is "Yes"), "dropout of two pulses (teeth)" is determined (step S116a). In that case, the cylinder identification processing is executed (step S117). The processing routine shown in FIG. 11 comes to an end.

When it is decided in the step S115b that K>2.25 (i.e., when the step S115b is "Yes"), "dropout of one pulse (tooth)" is determined (step S116b). In that case, the cylinder identification processing is executed (step S117).

As is apparent from the above, by determining the number of the pulse (tooth) dropout(s), it becomes possible to detect the reference position(s), whereby the cylinder identification processing (step S117) can be executed.

On the other hand, when it is decided in the step S115b that K≦6.25 (i.e., when the step S115b is "No"), "no pulse (tooth) dropout" is determined (step S116c). In that case, the cylinder identification processing is not executed (step S117). The processing routine shown in FIG. 11 is then terminated.

Next, referring to a flow chart shown in FIG. 12, the routine for changing over the reference position identification processing procedures of the first and second performance specifications will be described in more detail.

Figure 12:
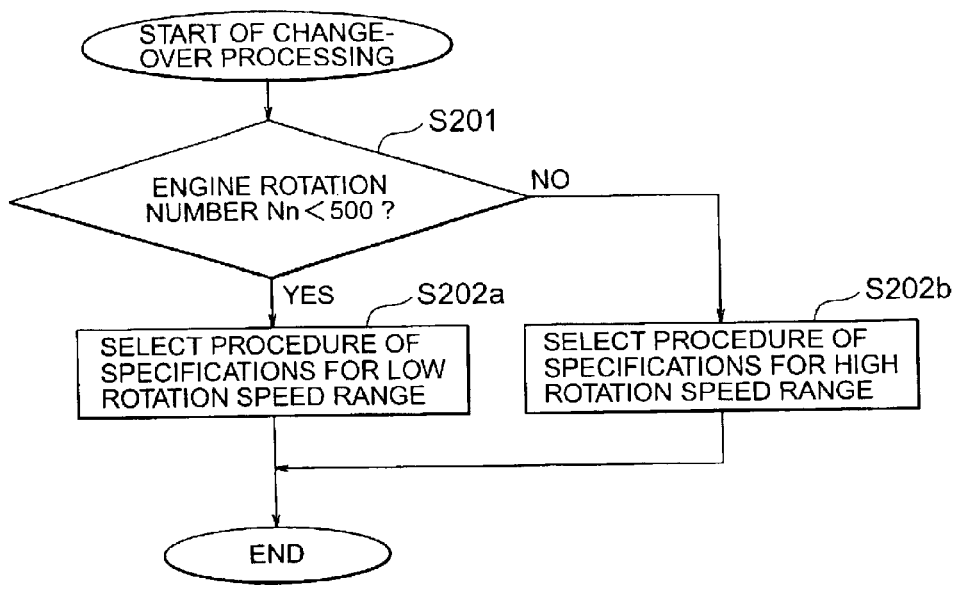
FIG. 12 is a flow chart showing a processing routine for changing over first and second reference position detecting means in dependence on an engine rotation number (rpm) according to the first embodiment of the invention.

In FIG. 12, steps S 201, S202a and S202b are similar to the steps S101, S102a and S102b described hereinbefore by reference to FIG. 9.

The reference position detecting means incorporated in the control unit 40 (see FIG. 1) is so designed as to arithmetically determine the current engine rotation number (rpm) Nn every tine the crank angle pulse signal is inputted to thereby decide whether or not the engine rotation number (rpm) Nn as determined is smaller than 500 rpm (step S201).

When it is decided in the step S201 that Nn<500 (i.e., when the step S201 is "Yes"), then the reference position identifying procedure of the first performance specifications for the low rotation speed range is selected (step S202a), whereupon the processing routine shown in FIG. 12 comes to an end.

On the other hand, when it is decided in the step S201 that Nn≦500 (i.e., when the step S201 is "No"), then the procedure of the first performance specifications for the high rotation speed range is selected (step S202b), whereupon the processing routine shown in FIG. 12 is terminated (END).

As described above, when the engine rotation number (rpm) Nn is smaller than 500 (rpm), the reference position identifying procedure of the first performance specifications for the low rotation speed range is adopted, whereas when the engine rotation number (rpm) Nn is not smaller than 500 (rpm), the procedure of the second specifications for the high rotation speed range is adopted.

Thus, the reference position can be detected on a per cylinder basis independently of the operation state of the engine 10. In other words, when the engine is operating at a low speed (rpm), the reference position detection and the cylinder identification can be carried out by adopting the processing procedure of high reliability (of the first performance specifications), while in the high rotation speed range, the reference position detection and the cylinder identification processing can be executed with high reliability through high-speed and simplified arithmetic procedure.

In addition, because the engine rotation number (rpm) Nn which is ordinarily available as the existing information is used as the decision reference for changing over the processing procedures of the first and second performance specifications, substantially no overhead is additionally incurred. Of course, additional cost can be avoided.

Embodiment 2

In the cylinder identifying system according to the first embodiment of the present invention, the reference position identifying processing procedures of the first and second performance specifications are changed over in dependence on the engine rotation number (rpm) Nn. A second embodiment of the invention is directed to the cylinder identifying system in which the changeover of the first and second specifications is performed in dependence on whether or not the engine is in the cranking state.

Now, the processing procedure according to the second embodiment of the present invention will be described.

The reference position detecting means incorporated in the control unit 40 is designed to make decision as to whether or not the engine is in the cranking state by referencing an operation state flag of the crank angle pulse signal when the crank angle pulse signal is inputted from the starter 50.

When it is determined that the engine is in the cranking state, the reference position detecting procedure of the first performance specifications for the low rotation speed range is effectuated. If otherwise, the reference position detecting procedure of the second performance specifications for the high rotation speed range is validated.

Figure 13:
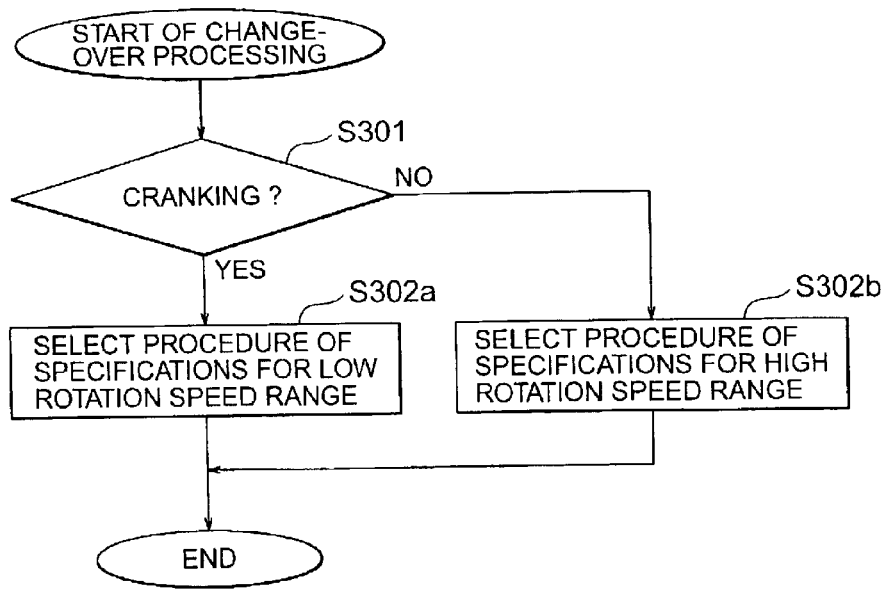
FIG. 13 is a flow chart showing a processing routine for changing over reference position identifying procedures of first and second performance specifications in dependence on a cranking state of the engine according to a second embodiment of the present invention.

FIG. 13 is a flow chart showing a processing routine for changing over the reference position identifying procedures of the first and second performance specifications in the cylinder identifying system according to the second embodiment of the invention. In FIG. 12, step S301, S302a and S302b are similar to those S201, S302a and 3302b described shown in FIG. 12.

Referring to FIG. 13, it is firstly decided whether or not the engine 10 is in the cranking state (step 3301). If so (i.e., when the step S301 is "Yes"), the reference position identifying procedure of the first specifications for the low rotation speed range is validated (step S302a), whereupon the processing routine shown in FIG. 13 comes to an end.

On the other hand, if not (i.e., when the step S301 is "No"), the reference position identifying procedure of the second specifications for the high rotation speed range is validated (step S302b), whereupon the processing routine shown in FIG. 13 comes to an end.

As is apparent from the above, it is possible to discriminatively determine the rotation range of the engine 10 by making use of the crank angle pulse signal to the advantageous effects equivalent to those described hereinbefore.

In other words, when the engine is operating in the low rotation speed range, the arithmetic processing procedure of the first performance specifications capable of coping with many interrupts and heavy load involved in the arithmetic operation is executed for detecting the reference position, whereas when the engine is operating in the high rotation speed range, the arithmetic processing procedure of the second simple performance specifications for which the load for arithmetic operation may be low can be used, whereby the reference position can be detected with high accuracy without fail independently of the operating states of the internal combustion engine.

Besides, because the operation state flag of the crank angle pulse signal which is intuitively facile is used as the reference for changing over the procedures of the first and second specifications, it becomes unnecessary to arithmetically determine the engine rotation number (rpm) for discerning the low rotation speed range and the high rotation speed range from each other. Thus the load otherwise imposed due to the additional arithmetic operation can be evaded. Many modifications and variations of the present invention are possible in the light of the above techniques. It is therefore to be understood that within the scope of the appended claims, the invention may be practiced otherwise than as specifically described.

What is claimed is:

1. A cylinder identifying system for an internal combustion engine, comprising:

crank angle signal generating means for generating a plurality of crank angle pulse signals in correspondence to rotation angles of a crank shaft of said internal combustion engine;

cylinder identifying signal generating means for generating cylinder identifying pulse signals corresponding to cylinders, respectively, of said internal combustion engine during rotation of a cam shaft arranged to rotate at a ratio of 1/2 relative to the rotation of said crank shaft;

reference position detecting means for detecting reference positions on the basis of said crank angle pulse signals;

cylinder identifying interval setting means for setting cylinder identifying intervals with reference to said reference positions;

cylinder identifying means for identifying said individual cylinders on the basis of said cylinder identifying pulse signals in said cylinder identifying intervals; and operation state detecting means for detecting operation state of said internal combustion engine in a low rotation speed range and a high rotation speed range of said internal combustion engine, wherein said reference position detecting means includes:

first detection processing means for effectuating a processing procedure of first performance specifications corresponding to said low rotation speed range; and second detection processing means for effectuating a processing procedure of second performance specifications corresponding to said high rotation speed range;

operations of said first detection processing means and said second detection processing means being changed over with each other in dependence on the operation states of said internal combustion engine.

2. A cylinder identifying system for an internal combustion engine according to claim 1, said operation state detecting means being designed to detect the rotation number of said internal combustion engine as an engine rotation number;

wherein said reference position detecting means changes over said first reference position detecting means and said second reference position detecting means with each other in dependence on said engine rotation number.

3. A cylinder identifying system for an internal combustion engine according to claim 1, said operation state detecting means being designed to detect a cranking state of said internal combustion engine, wherein said reference position detecting means changes over said first reference position detecting means and said second reference position detecting means with each other in dependence on presence/absence of said cranking state.

* * * * *